(12) United States Patent
Garber (10) Patent No.: US 7,513,075 B2
(45) Date of Patent: Apr. 7, 2009

(54) LOCKING SWIVEL APPARATUS

(76) Inventor: David P. Garber, 4800 Sourdough Rd., Bozeman, MT (US) 59715

( * ) Notice: Subject to any disclaimer, the term of this patent is extended or adjusted under 35 U.S.C. 154(b) by 248 days.

(21) Appl. No.: 11/090,937

(22) Filed: Mar. 24, 2005

(65) Prior Publication Data

US 2005/0241213 A1    Nov. 3, 2005

Related U.S. Application Data (60) Provisional application No. 60/582,516, filed on Jun. 24, 2004, provisional application No. 60/557,251, filed on Mar. 29, 2004.

(51) Int. Cl.
*A01K 85/12* (2006.01)
(52) U.S. Cl. .................... 43/42.19; 43/42.35; 43/44.92; 403/78; 403/90; 403/112
(58) Field of Classification Search .............. 43/42.11, 43/42.12, 42.14, 42.16, 42.17, 42.19, 42.35, 43/42.44, 44.92; 403/74, 78, 90, 112; D22/126, D22/129, 146
See application file for complete search history.

(56) References Cited

U.S. PATENT DOCUMENTS

| 612,576 A | 10/1898 | Smallwood |
| 745,131 A | 11/1903 | Abbath |
| 805,674 A * | 11/1905 | Senderling ............... 24/573.11 |
| 860,090 A | 7/1907 | Heidt |
| 1,267,430 A * | 5/1918 | McConnell ................ 403/353 |
| 1,766,532 A | 6/1930 | Pflueger |
| 1,998,035 A | 4/1935 | Weberg |
| 2,240,235 A | 4/1941 | Whan |
| 2,371,295 A | 3/1945 | Hopkins |
| 2,466,243 A | 4/1949 | Johnson |
| 2,554,342 A * | 5/1951 | O'Callaghan ............. 43/42.35 |
| 2,696,061 A * | 12/1954 | Swenson ................... 43/42.44 |
| 2,720,014 A | 10/1955 | Calowell |
| 2,758,410 A * | 8/1956 | Cowsert .................... D22/146 |
| 3,122,803 A | 3/1964 | Boggess et al. |
| 3,130,516 A * | 4/1964 | Ballard ..................... 43/42.19 |
| 3,277,549 A | 10/1966 | Bradshaw |
| 3,588,025 A * | 6/1971 | Gersman .................... 403/90 |
| 3,691,788 A * | 9/1972 | Mazziotti ................... 403/90 |
| 3,750,240 A | 8/1973 | Fridrich |
| 4,064,604 A | 12/1977 | Hartman |
| 4,100,658 A | 7/1978 | Nikota |
| 4,234,998 A | 11/1980 | McMickel |
| 4,274,252 A | 6/1981 | Cavender |
| 4,308,419 A | 12/1981 | Fredriksson |
| 4,369,551 A | 1/1983 | Heredea |

(Continued)

*Primary Examiner*—Michael P Ferguson
(74) *Attorney, Agent, or Firm*—Knobbe Martens Olson & Bear LLP (57) ABSTRACT

A unified swivel snap device provides optional rotational motion for use as fishing tackle to couple lures, bait hooks, and weights to a main fishing line. Embodiments include a rod rotatably held within a housing and a snap configured to lock the swivel by attaching to both the housing and the rod. Embodiments of the swivel can be unlocked by attaching the snap to the rod alone and allowing the rod to swivel relative to the housing. The swivel snap can be used for enhancing a variety of fishing mechanisms including the shank of jigs and the spindle of lures and other apparatus attached to fishing lines. Embodiments of the locking swivel snap can be used in other applications which call for selective locking of swivel motion.

26 Claims, 12 Drawing Sheets

U.S. PATENT DOCUMENTS

| | | | |
|---|---|---|---|
| 4,431,332 A * | 2/1984 | Dieges | 403/252 |
| 5,150,539 A | 9/1992 | Sorola | |
| 5,461,820 A | 10/1995 | Sorola | |
| 5,655,329 A | 8/1997 | Yong-Set | |
| 6,141,839 A | 11/2000 | Yong-Set | |
| 6,145,416 A * | 11/2000 | Bonniot | 403/74 |
| 2004/0041395 A1 | 3/2004 | Frost | |

* cited by examiner

LOCKING SWIVEL APPARATUS

RELATED APPLICATIONS

This application claims priority under 35 U.S.C. § 119(e) to U.S. Provisional Application Ser. No. 60/557,251, filed on Mar. 29, 2004, and U.S. Provisional Application Ser. No. 60/582,516, filed on Jun. 24, 2004, the disclosure of each of which is hereby incorporated by reference in its entirety.

BACKGROUND

1. Field of the Invention

This invention relates to locking swivel apparati. In some embodiments, the locking swivel apparati may be used in fishing to fasten terminal gear to a main line.

2. Description of the Related Art

In some embodiments, the locking swivel apparati of the invention may be used for fishing. The practice of fishing typically entails use of a rigid snap connector at the end of a primary line. Such snap connectors are generally devices for attaching fishing lines by a wire snap or clip. These wire snaps are generally small closeable wire structures with an openable loop for attaching gear to the end of a primary line. For example, devices such as double end locking wire snaps, twisted wire hook closures with eyelets, and devices with dual locking arms with eyelets have been used for some time.

In many situations a swivel body can also be used in attachment of lines. Such swivel bodies generally comprise an upper end to which a main line can be attached, and a lower end configured to rotate relative to the upper end. Terminal gear can then be connected to the lower end of the swivel by a wire snap in order to allow the terminal gear to rotate without twisting the main line.

Anglers on larger rivers and lakes frequently fish for various species in varying water depths with a variety of fabricated spoons, lures, bottom bouncers, weights, and natural bait hook arrangements. Many of these devices function correctly with only a non-swiveling snap connector to the line, while others also require a swivel to avoid twisting of the gear or the line and to provide proper action for the hook assembly. Many existing swivel devices also include a snap. However, one must remove the entire assembly in order to replace it with a snap when a non-swiveling snap is desired.

SUMMARY OF THE INVENTION

Therefore, it is desirable to integrate the functions of a swivel and a non-swiveling snap into a single device. Thus, embodiments of the present invention bridge the arts of non-swiveling snaps and swivel bodies by integrating swivel and snap functions into a unified device which includes a locking mechanism that can be adjusted by the operator to select either the non-swiveling snap alone, or the swivel and snap functions together.

Accordingly, some embodiments of the present invention provide a new fishing tackle wherein the action of a swivel can be manually engaged or disengaged using an integrated snap fastener. Such embodiments of the invention advantageously provide simplified means to meet design criteria in the use of terminal gear to enhance varied fishing techniques. Embodiments of the invention also reduce the risk and difficulties inherent in cutting and retying lines to individual snaps, swivels, or traditional swivel snap combinations, and also reduce the amount and variety of attachment hardware in an angler's tackle box, and the frequency of need to access such storage.

Embodiments of the invention advantageously integrate the option for swivel action with the provision of a snap closure to which all types of hooks and lures can be easily fastened and effectively deployed to meet their design capabilities. By combining a traditional snap connector with an optional swivel, embodiments of the present device facilitate a wide array of fishing techniques without the common difficulties of cutting and retying lines to individual snaps, swivels, or traditional swivel snap combinations.

In one embodiment of the invention, a locking swivel snap apparatus for connecting fishing lines to terminal tackle is provided, including a housing member with an upper end configured to receive a main fishing line and an opening on a lower end, a head retained within the housing, the head being rotatably and axially movable in the housing, and a shaft extending from the head and through the opening in the lower end of the housing, the shaft having apertures therein, wherein the housing includes apertures configured to be aligned with a shaft aperture such that a solid body can be placed in the housing apertures and a shaft aperture. In an aspect of the embodiment, the upper end of the housing includes an eye by which a main fishing line can be fixed. In another aspect of the embodiment, the head is configured to rotate on at least one ball bearing. In another aspect of the embodiment, the head comprises a cylindrical shape. In another aspect of the embodiment, the solid body includes a wire snap configured to receive an item of terminal fishing tackle thereon. In another aspect of the embodiment, the housing is substantially cylindrical. In another aspect of the embodiment, the shaft includes a plurality of apertures. In another aspect of the embodiment, the aperture extending through the shaft is an elongate slot. In another aspect of the embodiment, the solid body includes a pin. In another aspect of the embodiment, the housing includes a constriction adjacent the opening, the constriction configured to retain the head within the housing.

In another embodiment, a method of locking a swivel snap apparatus is provided, including obtaining an apparatus including a housing having a rod extending from a lower portion thereof, the rod including a head with a bearing surface retaining the rod within the housing, the rod being rotatable relative to the housing about a longitudinal axis of the housing, the apparatus further including a clip extending through an aperture extending through the rod, the method including aligning a rod aperture with a pair of apertures in the housing, and inserting the clip through the housing apertures and the rod aperture, thereby restricting rotational movement of the rod relative to the housing. In an aspect of the embodiment, aligning a rod aperture with the housing apertures includes moving the rod axially within the housing. In an aspect of the embodiment, the clip includes a locking wire snap. In another aspect of the embodiment, the method also includes attaching an item of terminal fishing tackle to the clip. In another aspect of the embodiment, the method also includes removing the clip from the housing and rod apertures, positioning the rod such that the rod aperture extends below a lower end of the housing, attaching the clip to the rod aperture and thereby allowing rotational movement of the rod relative to the housing. In an aspect of the embodiment, rotating includes rotating the rod at least one full turn about a longitudinal axis of the housing. In another aspect of the embodiment, the method also includes applying an axial tensile load between an upper end of the housing and a lower end of the clip. In another aspect of the embodiment, the method also includes applying an axial tensile load between an upper end of the housing and a lower end of the clip.

In another embodiment, an apparatus is provided, including a housing member including an opening on a lower end, and a rotatable member including a bearing surface configured to axially retain the rotatable member within the housing, the rotatable member being rotatably and axially movable in the housing, wherein a locking member can be used to limit rotational motion of the rotatable member relative to the housing. In an aspect of the embodiment, the rotatable member includes a cavity which extends at least partially into the rotatable member, the housing includes an aperture configured to be aligned with said cavity; and the locking member includes a solid body that can be placed in the housing aperture and extend at least partially into the cavity of the rotational member. In another aspect of the embodiment, the cavity includes a rotational member aperture extending perpendicular to a longitudinal axis of the rotatable member, and the housing includes housing apertures configured to be aligned with the rotatable member aperture such that the solid body can be placed in the housing apertures and the rotatable member aperture to limit rotational motion of the rotatable member relative to the housing. In another aspect of the embodiment, the bearing surface includes at least one ball bearing. In another aspect of the embodiment, the rotatable member includes a rod.

In another embodiment, a swivel snap apparatus is provided, including a first end and a second end, the first end and the second end being configured to receive a fishing line therein, the second end being adapted to be switchable between a first configuration in which the second end is fixed relative to the first end and a second configuration in which the second end is rotatable relative to the first end. In an aspect of the embodiment, the first end includes a housing and the second end includes a member internal to the housing. In a further aspect of the embodiment, the housing includes an aperture and the member internal to the housing includes an aperture, wherein in the first configuration the aperture in the housing is aligned with the aperture in the member internal to the housing and a solid member extends through the aperture in the housing and the aperture in the member internal to the housing. In another aspect of the embodiment, the apparatus also includes a locking element configured to fix the second end of the swivel snap relative to the first end, wherein the locking element is further configured to receive and retain a piece of fishing tackle. In another aspect of the embodiment, the apparatus also includes a threaded nut configured to thread onto the second end to fix the second end against rotation relative to the first end.

In another embodiment, a fishing apparatus is provided which can be switched between a first locked configuration in which the apparatus acts as a snap and a second unlocked configuration in which the apparatus acts as a swivel and as a snap. In an aspect of the embodiment, the apparatus includes a housing having a pair of slots therein and a rod extending from the housing, the rod having a snap inserted through an aperture in the rod; wherein the rod is axially and rotatably movable relative to the housing such that the snap can be moved into the slots and retained in a portion of the housing, thereby locking a rotational movement of the rod relative to the housing.

In another embodiment, a locking swivel snap apparatus for connecting fishing lines to terminal tackle is provided, the apparatus including a housing member with an upper end configured to receive a main fishing line and an opening on a lower end, a head retained within the housing, the head being rotatably movable in the housing, a shaft extending from the head and through the opening in the lower end of the housing, the shaft having at least two apertures therein, wherein at least one of the apertures is positioned between the lower end of the housing and the head.

In another embodiment, a locking swivel apparatus is provided, including a housing, a rod, means for retaining the rod within the housing, the retaining means permitting the axial rotation of the rod relative to the housing, and means for selectively limiting the axial rotation of the rod relative to the housing.

BRIEF DESCRIPTION OF THE DRAWINGS

Having thus summarized the general nature of the invention, certain preferred embodiments and modifications thereof will become apparent to those skilled in the art from the detailed description herein having reference to the figures that follow, of which.

DETAILED DESCRIPTION OF THE PREFERRED EMBODIMENTS

Embodiments of a universal swivel snap device generally include a housing (1) having an open lower end (22) through which a rod (3) extends and an upper end (24) from which an eye (2) extends. The rod (3) comprises apertures (9) generally configured to receive a clip or wire snap (30). The rod (3) is also generally configured to be at least rotationally (and in some embodiments both axially and rotationally) movable relative to the housing (1). In some embodiments, the housing (1) also includes apertures (6) configured to be aligned with the apertures (9) of the rod (3) such that a wire snap (30) can be inserted through the housing apertures (6) and through the rod apertures (9), thereby substantially limiting the ability of the rod (3) to rotate relative to the housing (1).

Figure 1:
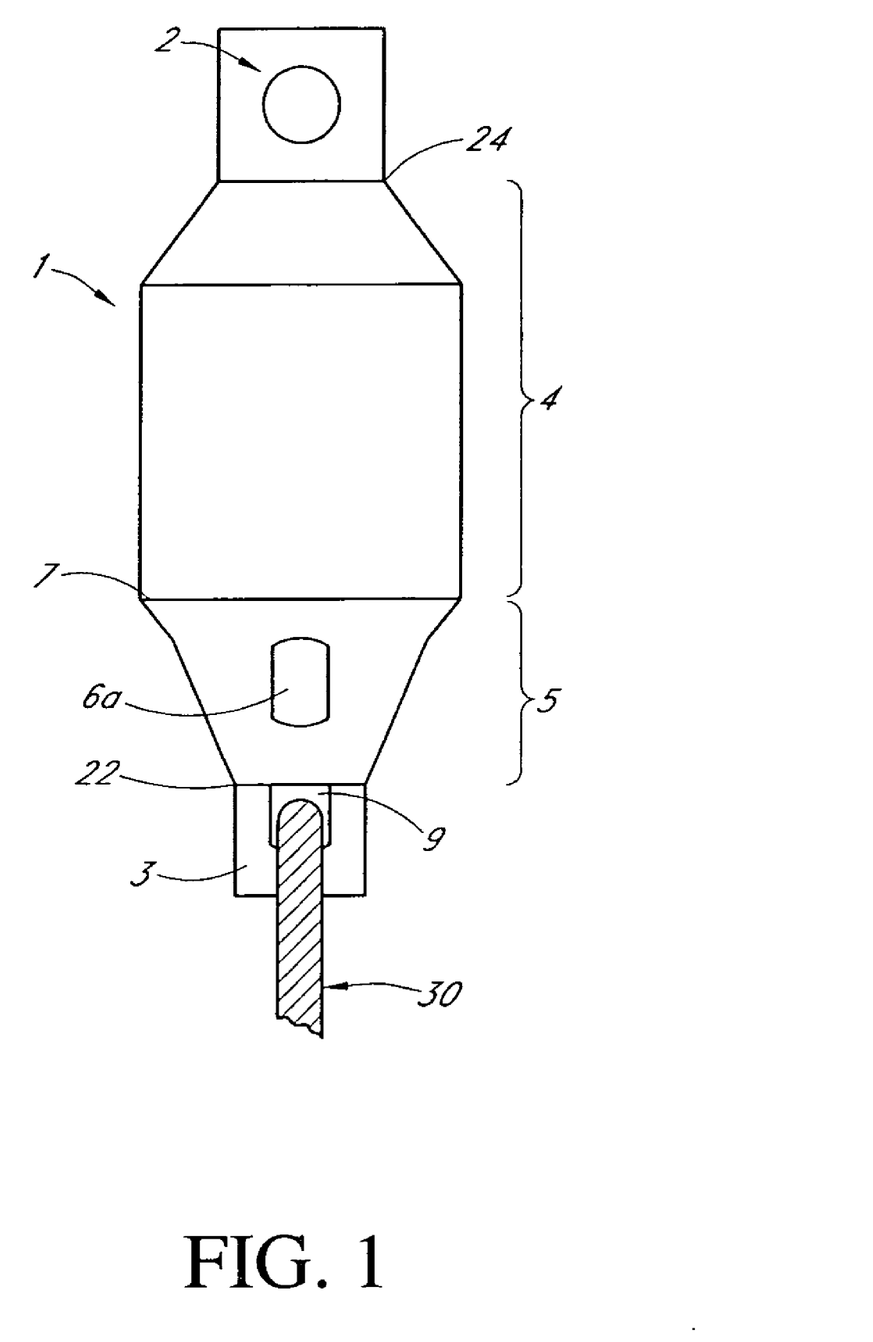
FIG. 1 is a frontal elevation view of one embodiment of a swivel device.

With reference to FIG. 1, the illustrated device includes a housing section (1) with a static post or stud with an eye (2) on an upper (lead) end (24) and an opening on the lower (trailing) end (22) from which a rod or dowel (3) extends.

In some embodiments, the housing (1) can be substantially cylindrical in shape, and can be formed by assembling first (20*a*) and second (20*b*) housing parts. The first (20*a*) and second (20*b*) housing parts can be secured to one another by a press fit, adhesives, threads, or any other suitable attachment means. A cylindrical housing (1) can be provided in the approximate proportion of one-to-three, width to length. In one embodiment the upper two-thirds (4) of the housing including the static stud eye (2) can be preformed and press fit over the lower one-third (5) of the housing that itself can be preformed with two lateral apertures (6) on opposing sides of the housing (1). Thus, in some embodiments, the housing (1) forms a cavity possessing a ridge (7) along the internal circumference of the seam of the joined housing halves (e.g. see FIGS. 2A and 2B). Alternative constructions are also possible. For example, the housing can be formed as a single piece having a hinge joint. Alternatively, the housing can be formed in a one-piece construction, and a rod (3) can be configured to be inserted through a lower aperture of the housing (1).

Figure 3:
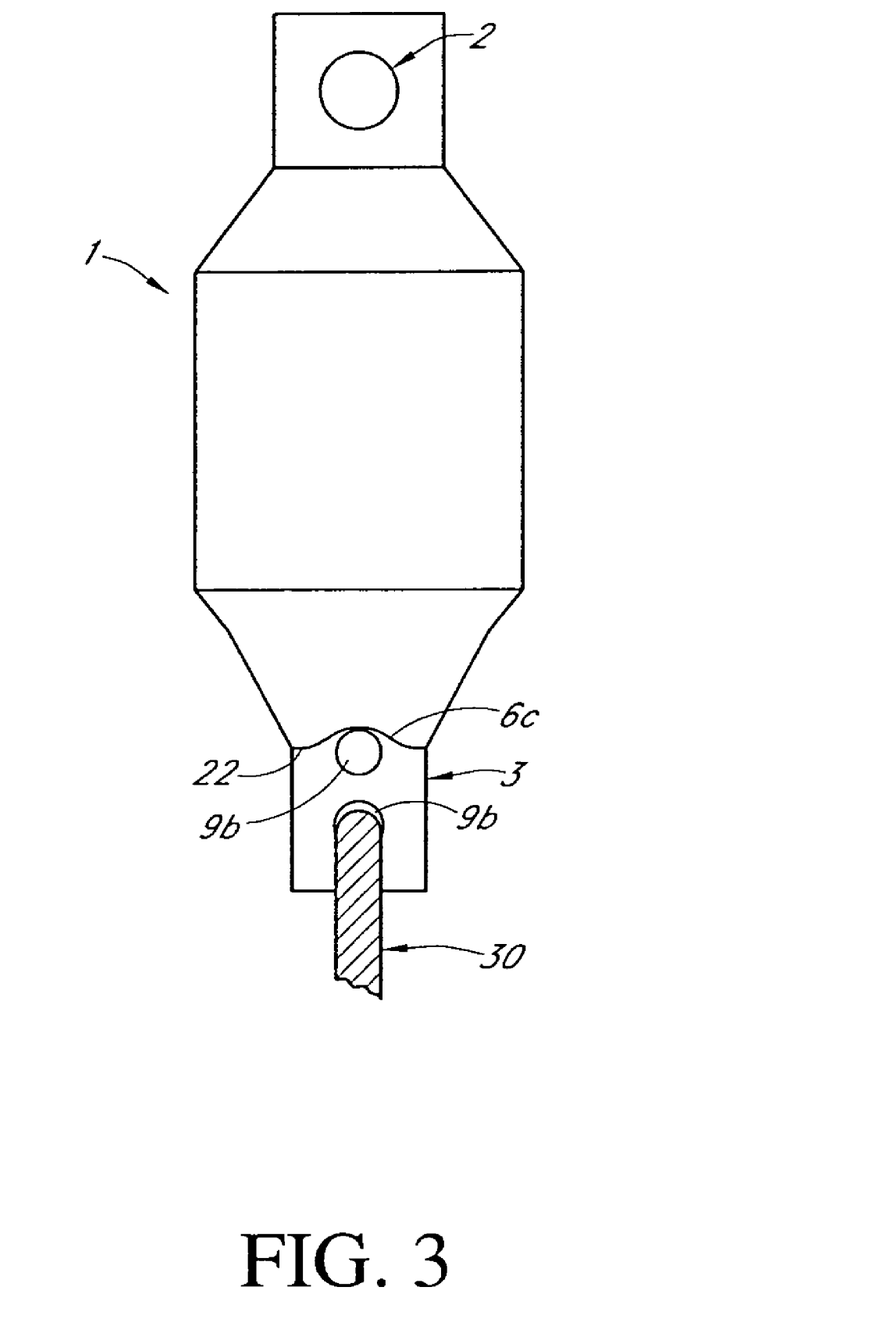
FIG. 3 is a front view of an alternative embodiment of a locking swivel.

In some embodiments, the housing apertures (6) can comprise holes in the housing sidewalls. For example, the apertures can comprise elliptical holes (6*a*) as illustrated in FIG. 1. Alternatively, the apertures can comprise circular (6*b*) (see FIG. 12) or otherwise shaped holes as desired. In an alternative embodiment, illustrated for example in FIG. 3, the apertures (6) can comprise arcuate scallops (6*c*) in a lower surface (22). In the embodiment of FIG. 3, the upper rod aperture (9) is located such that a snap inserted therethrough will engage the arcuate scallops (6*c*) of the housing in order to lock the rod (3) against rotation.

Figure 4A:
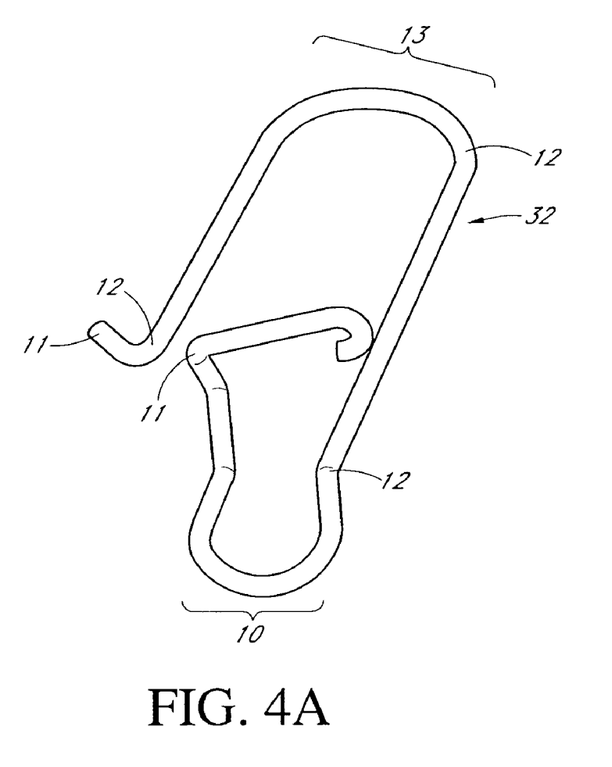
FIG. 4A is a front view of one embodiment of a wire loop combination retainer and snap closure for use with a locking swivel, shown in an unlocked position.
Figure 4B:
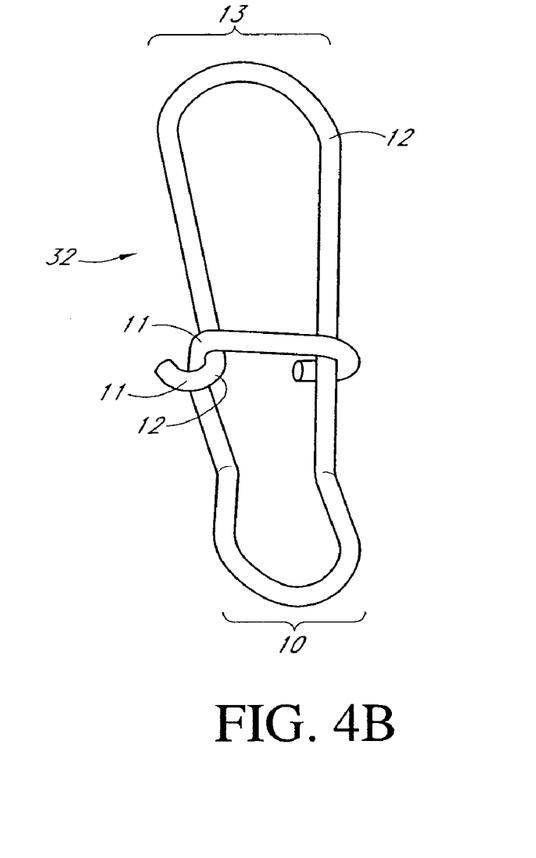
FIG. 4B is a front view of the wire loop combination retainer and snap closure of FIG. 4B, shown in a locked position.

With reference to FIGS. 4A and 4B, in embodiments in which the device is used for fishing, a means for connecting lures, hooks and weights can be a wire loop combination retainer and snap (32) configured with locking arms (11). FIG. 4A depicts such a snap (32) in an open position, and FIG. 4B depicts snap (32) in a closed position. The snap (32) is typically constructed from a metallic material of suitable length and spring force to form two spring loops drawn into interdependent locking positions. The angularity at critical points of radii (e.g. 12) can be configured to pass through the housing apertures (6, 6*a*, 6*b*, and 6*c*) and the rod apertures (9, 9*a* and 9*b*). The retainer loop end (10) is generally configured to be inserted through the aperture (9, 9*a* and 9*b*) of the rod below (3) the housing (1) and locked as in FIG. 2A and FIG. 3. Alternatively, the retainer loop end (10) can be configured to be inserted through the collateral apertures (6) of the housing (1) and the rod (3), thereby locking the swivel apparatus as shown in FIG. 2B. The snap loop end (13) of a wire loop combination retainer and snap closure (32) can be pendently hinged at either position on said housing for attachment of terminal gear as shown, for example in FIG. 5. Alternatively, any clip, wire snap, link, or any other suitable device known to the skilled artisan can be used in place of the illustrated snap (32).

Figure 2A:
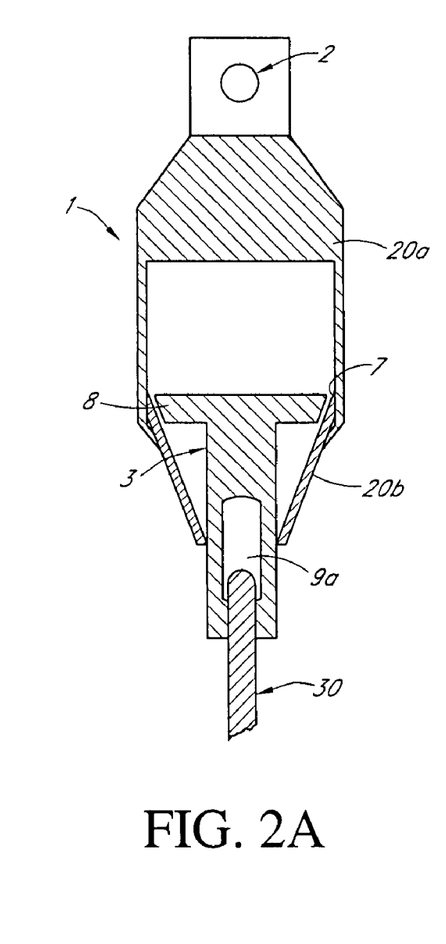
FIG. 2A is a section view of the device of FIG. 1 with the swivel in an unlocked position.
Figure 2B:
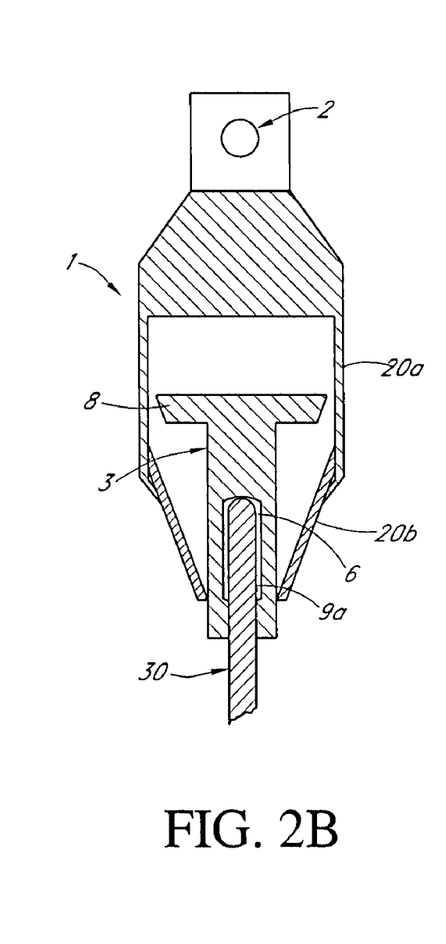
FIG. 2B is a section view of the device of FIG. 1 with swivel locked.
Figure 6:
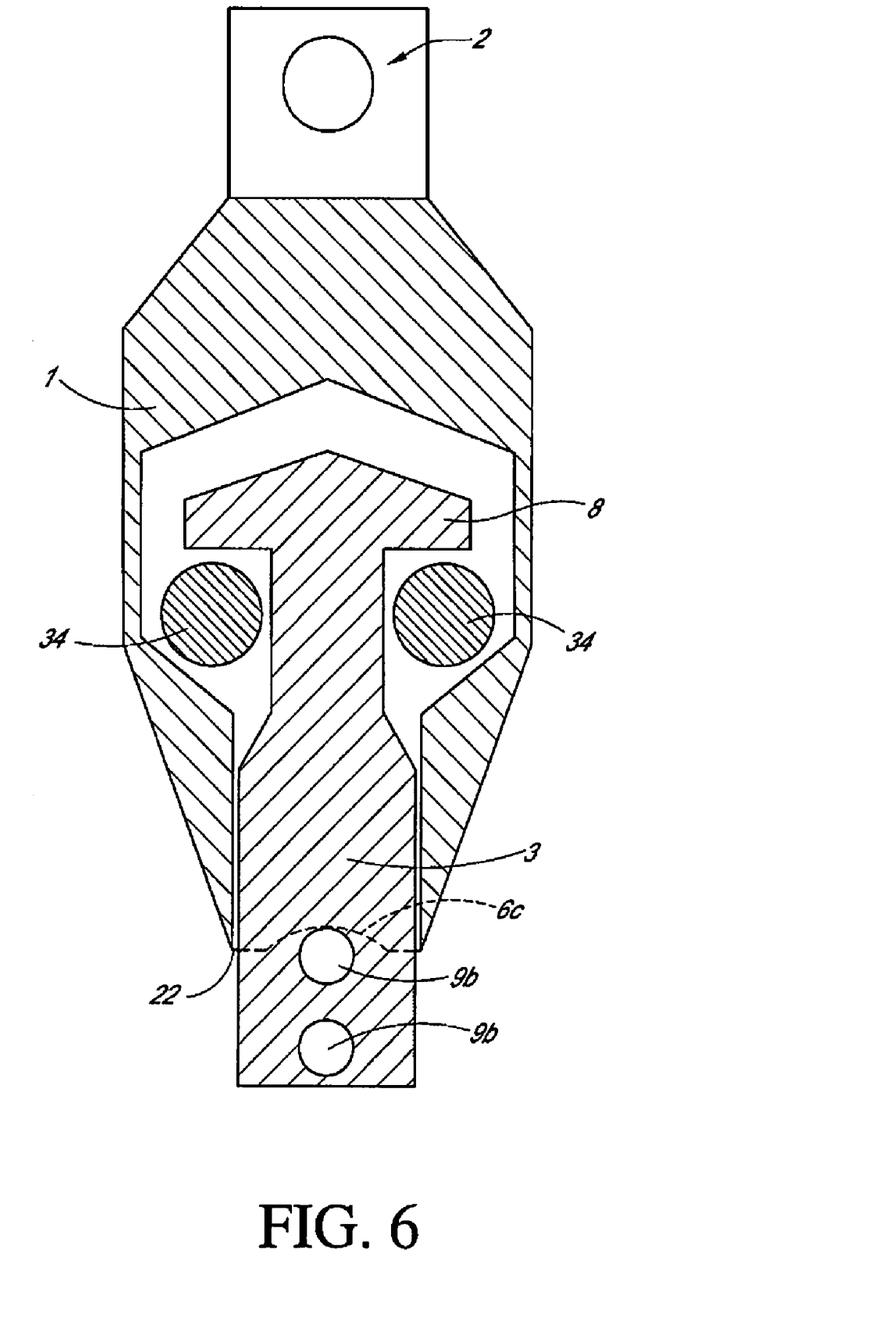
FIG. 6 is a sectional view of an alternative embodiment of a locking swivel device comprising ball bearings.

As shown in the embodiment of FIGS. 2A and 2B, the rod (3) can be a swivel shaft with a head (8) held in the housing (1) to rotate freely on a bearing ridge (7) formed by coupling cylindrical housing parts (20*a*, 20*b*). Alternatively, as shown in FIG. 6, the head can rotate on one or more ball bearings (34) in the housing with a rod (3) extending therefrom. According to the embodiment of FIG. 6, a bearing surface between the head and the housing is a raceway.

Figure 7:
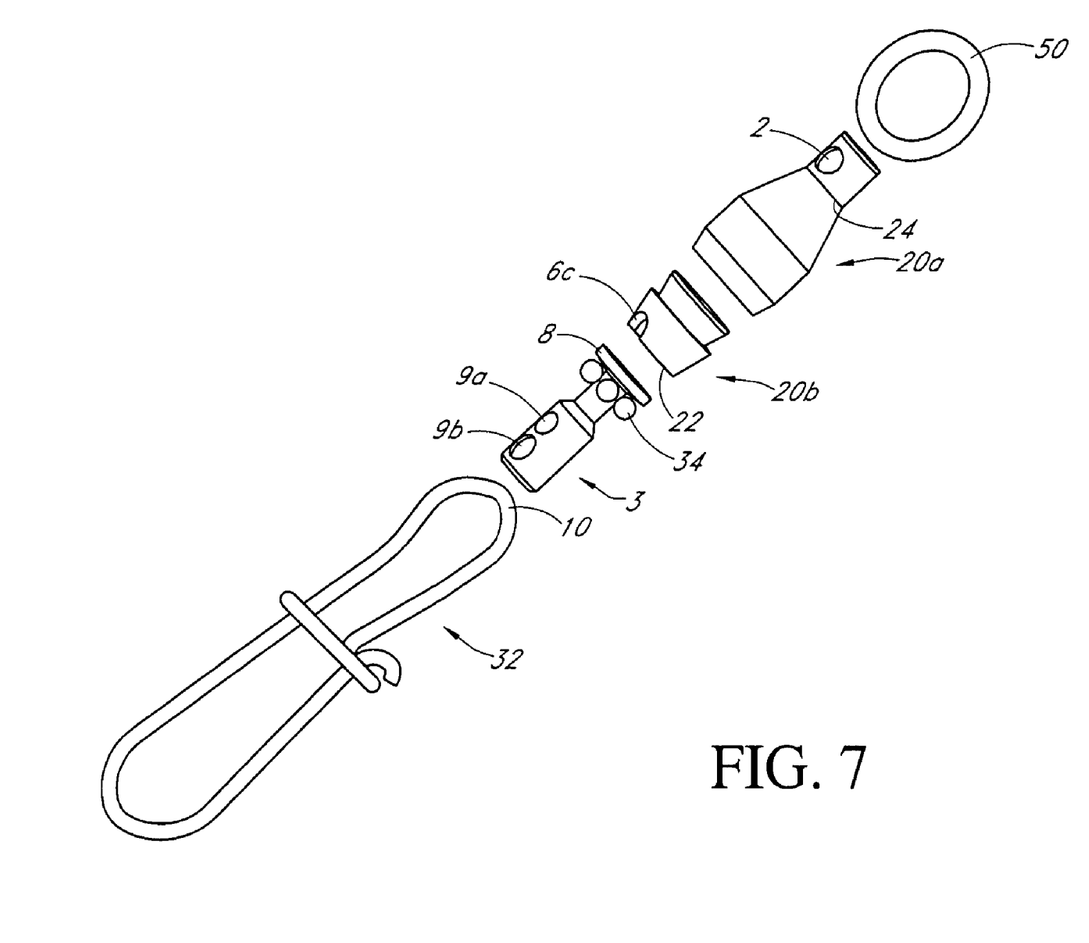
FIG. 7 is an exploded view of an embodiment of a locking swivel device comprising ball bearings.

FIG. 7 is an exploded view of an embodiment similar to that discussed with respect to FIG. 6. The retainer end (10) of the snap (32) is configured to engage the arcuate scallops (6*c*) in an open lower end (22) of a second housing part (20*b*), such that rotational movement of the second housing part (20*b*) relative to the snap (32) is impaired when the retainer end (10) engages arcuate scallops (6*c*). When assembled, the second housing part (20*b*) will be secured to a first housing part (20*a*) by any suitable attachment means previously discussed, forming a housing which surrounds a head (8) of a rod (3). Rod (3) further comprises rod apertures (9*a*) and (9*b*), which are configured such that the snap (32) is insertable through either of the apertures (9*a*, 9*b*). Located below the head (8) of rod (3) are ball bearings (34), which enable easier rotational movement of rod (3) relative to the assembled housing. First housing part 20(*a*) comprises an eye (2) within a static post on an upper end (24), which can be used to secure the assembly to, for example, ring (50).

Figure 8:
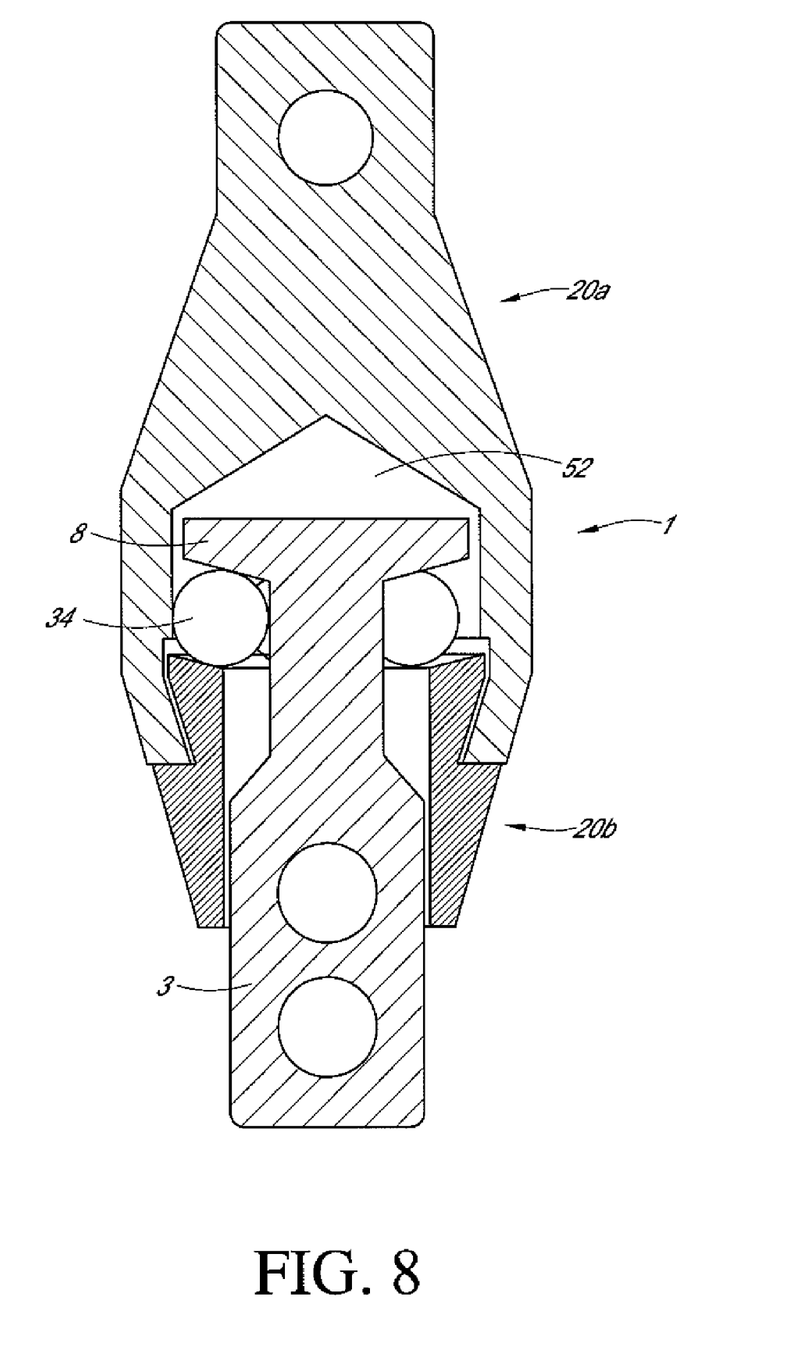
FIG. 8 is a cross-section of the embodiment of FIG. 7, shown in an assembled state.

FIG. 8 is a cross-sectional view of the assembled housing and rod of the embodiment of FIG. 7. It can be seen that the interior of the assembled housing (1), formed by securing first housing part (20*a*) to second housing part (20*b*), contains the head (8) of rod (3), under which sit ball bearings (34). It can be seen that, in certain embodiments, the shape of the interior cavity (52) may prevent significant axial translation of rod (3) relative to housing (1).

Figure 9A:
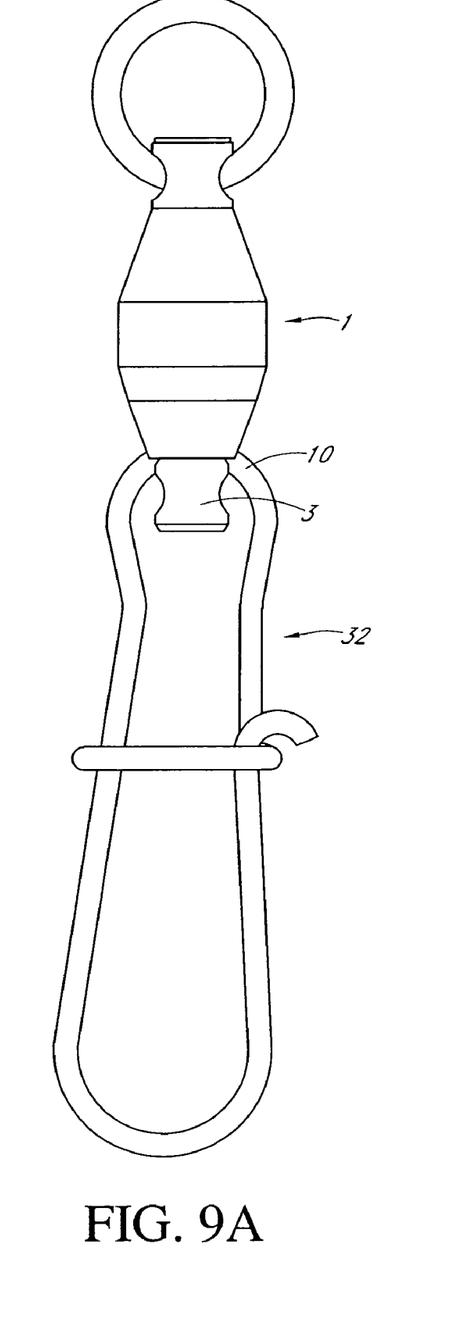
FIGS. 9A and 9B are side views of the embodiment of FIG. 7, shown with the snap inserted such that the swivel is in a locked position.
Figure 9B:
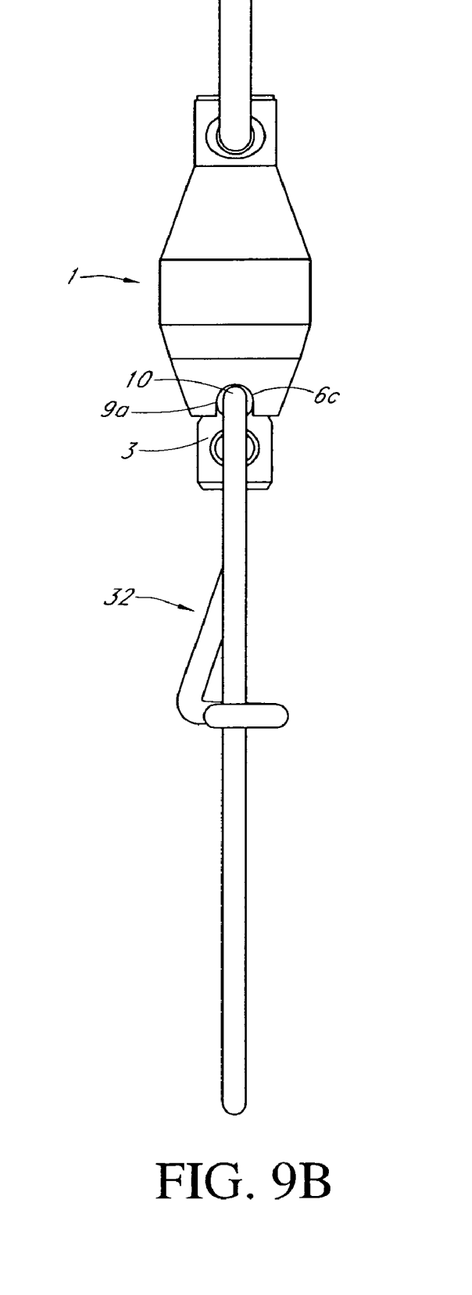

Now with respect to FIGS. 9A and 9B, assembled views of the embodiment of FIG. 7 are depicted. In FIG. 9B, it can be seen that arcuate scallop (6*c*) is aligned with rod aperture (9*a*), and that the retainer end (10) of the snap (32) has been inserted through aperture (9*a*) and has engaged arcuate scallop (6*c*), inhibiting axial rotation of the rod (3) relative to assembled housing (1). In alternate embodiments, axial translation of the rod relative to housing (1) is to some degree not inhibited by the design of the interior cavity of the housing (1) and the design of the rod (3). In such embodiments, it can be seen that the engagement of the snap (32) with arcuate scallop (6*c*) and aperture 9*a* will inhibit axial translation of the rod (3) toward the assembled housing (1).

Figure 10A:
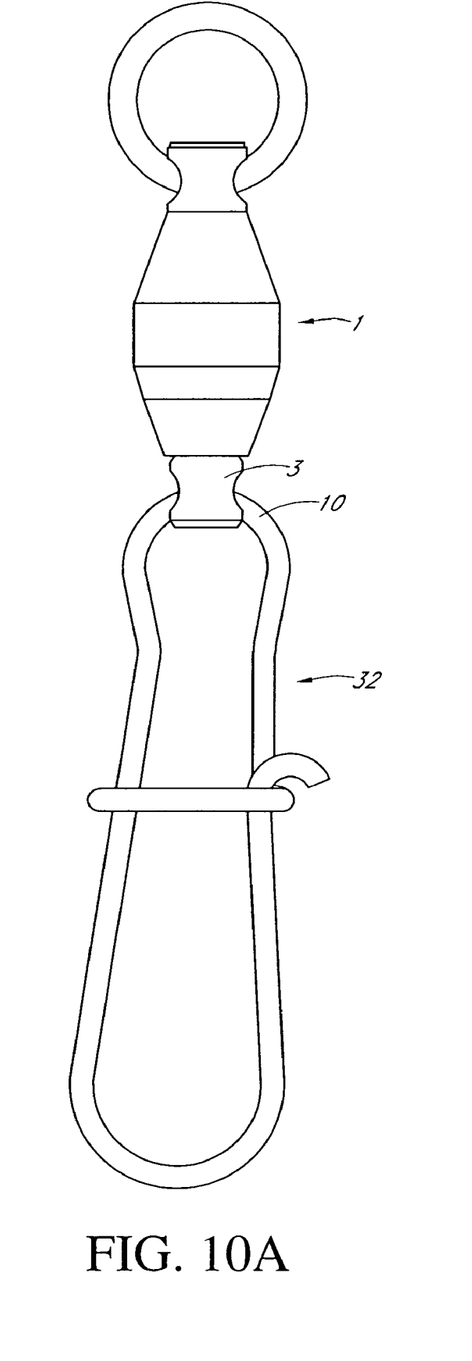
FIGS. 10A and 10B are side views of the embodiment of FIG. 7, shown with the snap inserted such that the swivel is in an unlocked position.
Figure 10B:
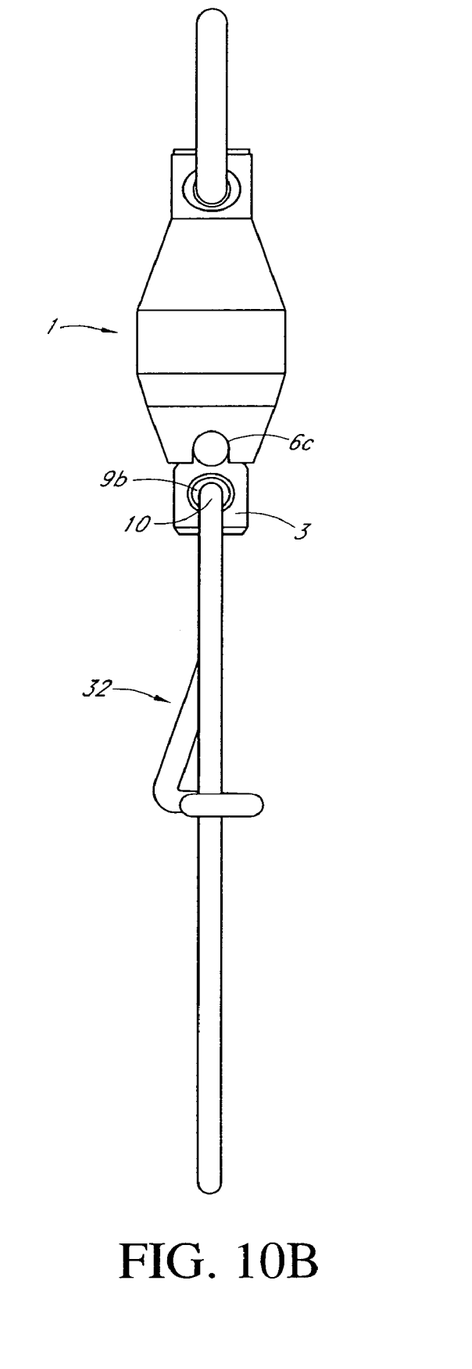

FIGS. 10A and 10B depict the embodiment of FIG. 7 in an assembled and unlocked position. In FIG. 10A, it can be seen that the retainer end (10) of the snap (32) has been inserted through aperture (9*b*), such that arcute scallop (6*c*) is not engaged. Thus, axial rotation of rod (3) relative to assembled housing (1) is not inhibited.

Figure 11:
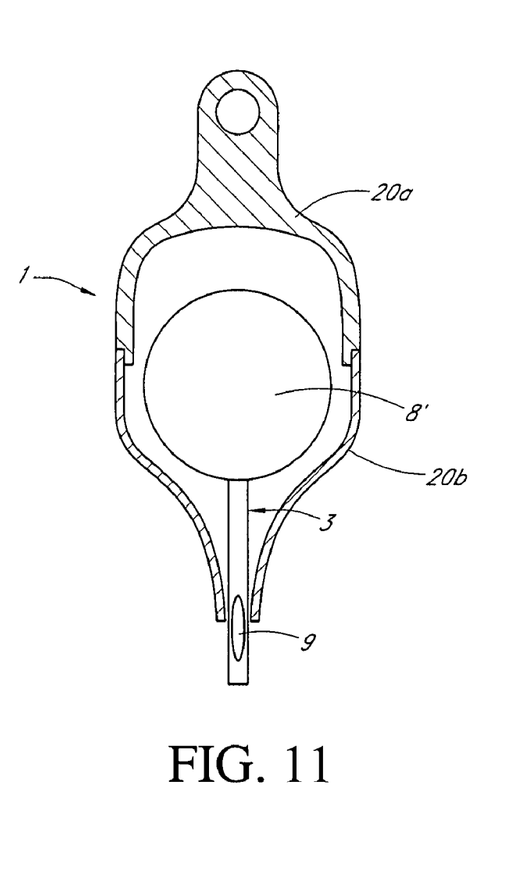
FIG. 11 is a section view of an alternative embodiment of a locking swivel snap device comprising a ball bearing-shaped head.

In another alternative embodiment, as illustrated for example in FIG. 11, the head can comprise a spherical ball (8') (e.g. a ball bearing) with a rod (3) extending therefrom. According to this embodiment, a bearing surface between the head (8') and the housing can be substantially semi-cylindrical. A rod (3) can be inserted (e.g. press fit, threaded, etc) into a hole in the ball-shaped head (8'), or the rod (3) and ball (8') can be formed as a unitary structure, such as by molding or machining.

Figure 5:
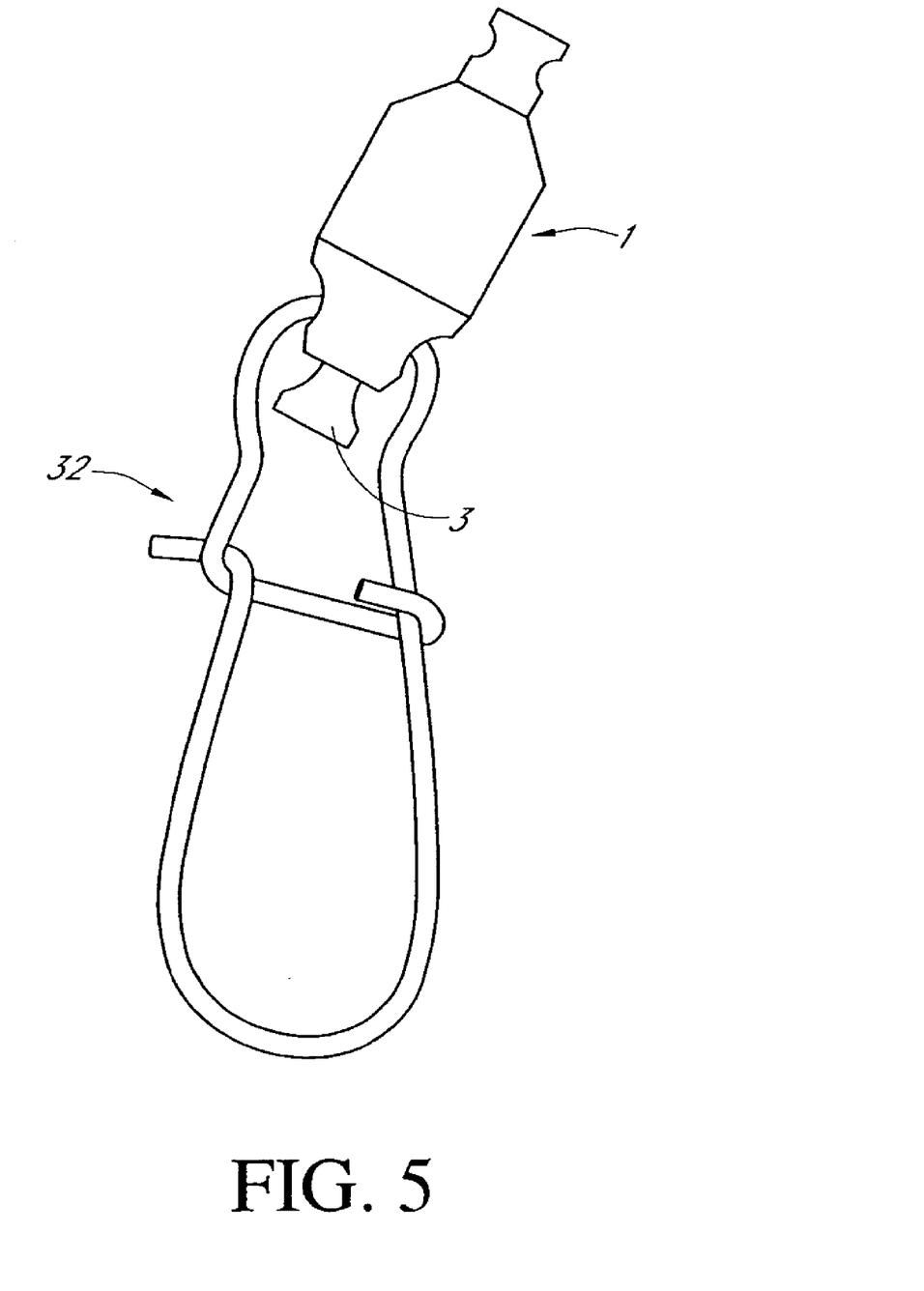
FIG. 5 is a side view of a locking swivel device shown with a snap in a locked position.

In some embodiments, the swivel shaft can be perforated with a slotted aperture (9*a*), such as that shown in FIGS. 2A, 2B and 5. A slotted aperture (9*a*) can be utilized as shown in FIGS. 2A and 2B to allow a snap to be connected to the device in either the "locked" (FIG. 2B) or "unlocked" (FIG. 2A) position without the need for moving the rod axially within the housing. Alternatively, this advantage can be achieved by providing a plurality of holes in the rod (3) to allow for connection of the snap at various locations along the rod (3) (e.g. FIGS. 3, 5, 6).

Figure 12:
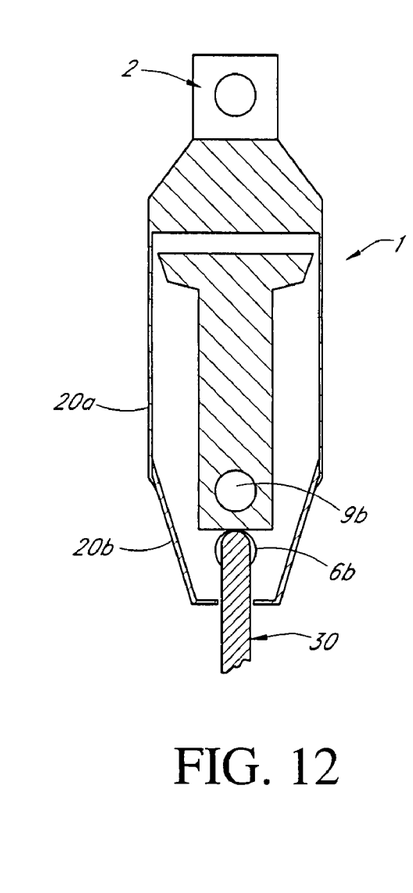
FIG. 12 is a section view of an alternative embodiment of a locking swivel, shown in a locked position.

In an alternative embodiment, as shown in FIG. 12, the rod (3) can be provided with a single circular aperture (9b) and the rod (3) can be moved axially within the housing to align the rod aperture (9b) with the housing apertures (6) to lock the device. Alternatively, the rod (3) can be positioned within the housing (1) such that the circular aperture (9b) extends from the lower end (22) of the housing to allow the device to be used in an unlocked position. Alternatively still, the rod (3) can be configured to retract entirely within the housing (1) to allow a snap (30) to be connected to the housing without extending through the rod aperture (9b) as shown in FIG. 4. A cylindrical housing (1) according to this alternative embodiment can be provided in the approximate proportion of one-to-four, width to length, although other ratios can also be used.

In further alternative embodiments the rotational motion of the swivel can be provided for by any suitable swivel device including various types or constructions of a shaft within a tubular skeleton or the equivalents thereof and thereby providing surfaces of reduced friction facilitating rotary motion wherein the rotational motion of the swivel can be locked to affect attached tools.

The rod apertures (9, 9a and 9b) can be configured such that the retainer end (10) of a wire loop combination retainer and snap (such as that shown in FIGS. 4A and 4B) can be inserted therein at optional positions either through the cylindrical housing and rod (e.g. as shown in FIG. 2B) to arrest rotation and retain only the snap function, or below the cylindrical housing (e.g. as shown in FIG. 2A), for both swivel and snap functions.

Figure 13:
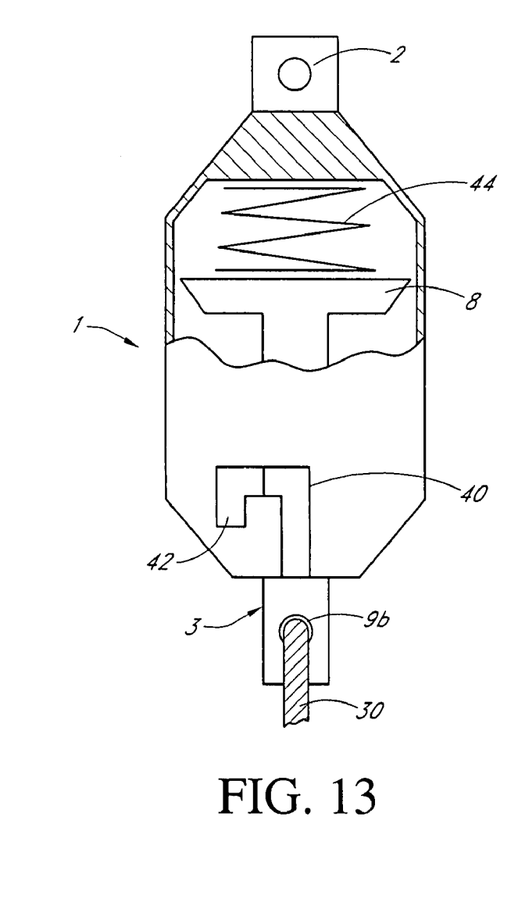
FIG. 13 is a partial cut-away view of another alternative embodiment of a locking swivel snap device comprising slotted apertures.

FIG. 13 illustrates still another alternative embodiment in which the housing apertures include slots (40). In the embodiment of FIG. 13, the rod (3) can include a single circular aperture (9b) and a slot (40) can include a locking section (42). If desired, a spring (44) can be positioned within the housing (1) between the head (8) and an upper inner surface of the housing to bias the head (8) and rod (3) downwards. Thus, in the position shown, the swivel is free to rotate. The swivel illustrated in FIG. 13 can be locked by moving the rod (3) and snap (30) upwards within the slot (40), then rotating the rod (3) and snap (30) to the locking section (42) of the slot (40). The rod (3) and snap (30) can then be released and the spring (44) can retain the snap (30) in the locking section (42) of the slot (40). In still further embodiments, slots of other shape, size, etc. can also be used to lock the swivel.

Figure 14:
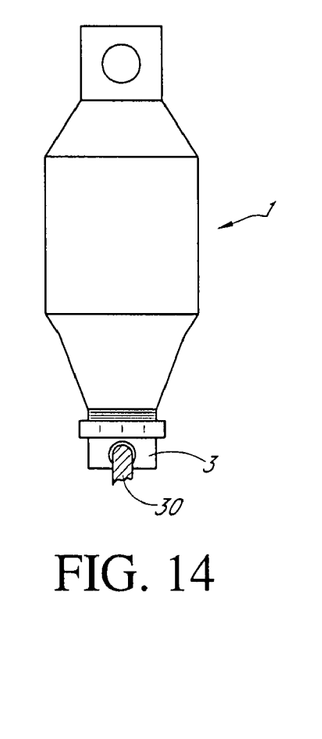
FIG. 14 is a side view of an alternative embodiment of a locking swivel snap device comprising a threaded nut for locking the device.

In further alternative embodiments, the rotational motion of the swivel can be locked with transverse pins such as a set screw, a pressure activated push-pin located on the swivel housing, spring-loaded pins, or other clips, clamps, cotter pins, hitch pins, hair pins, etc. Such alternative pins, screws, clips, clamps etc. can be any type or construction recognized as suitable for locking a rotational motion of the rod relative to the housing. Mechanisms other than pins may also be employed to prevent the rotational motion of the swivel such as a threaded nut on a threaded swivel rod (as shown for example in FIG. 14).

While embodiments of the present invention have been discussed primarily with relation to the use of a locking swivel in connection with fishing equipment, it will be apparent that embodiments of the invention can be utilized for a wide range of purposes, with locking swivel devices having a wide range of sizes and designs.

Suspension of items on swivel hooks is a useful technique in factories and other locations where persons working on those items need access to various sides of a given item. For instance, in the meat-cutting industry, swivel hooks are used to suspend carcasses and convey them through a meat cutting plant. While the rotational freedom provided by the swivel hook is desirable so that a worker can orient the suspended item in any way needed, it may be desirable for both safety and productivity reasons to provide a way of inhibiting the rotation of the suspended item. Such inhibition can be used, for instance, to prevent rotation of a bulky item as it moves through a factory, or to maintain a particular orientation of a device A heavy-duty locking swivel similar to the embodiments previously discussed can be employed in such a situation to provide an easy method for such a worker to inhibit rotation of such a swivel hook. Any method of inhibiting rotation discussed above can be employed, including but not limited to the use of a set screw, a removable pin or a spring loaded pin. Certain modifications to the embodiments discussed above may be desirable, such as the inclusion of multiple apertures or arcute scallops arranged at various positions around the housing, in order to enable the locking of the rod and suspended item into various rotational positions when a pin or other item extending through the rod is used to inhibit rotation.

Embodiments of the present invention may also be used in a variety of household tools, where it may be desirable to have a tool which can be easily switched between a rotatable state and a locked state. For instance, a window cleaning device could be constructed having a cleaning end which can be made rotatable relative to the handle. Such a design would be particularly advantageous in a device which can employ multiple cleaning attachments, certain of which require that the handle be rotatable with respect to the attachment, and certain of which require that the handle be fixed relative to the attachment.

In addition, while many of the embodiments discussed above utilize a solid body which extends completely through the rod, it will be apparent to one having ordinary skill in the art that many of the above discussed embodiments may be modified to include a solid body which extends, for example, through a single aperture in the housing and only partially into the rod.

Although certain embodiments and examples have been described herein, it will be understood by those skilled in the art that many aspects of the methods and devices shown and described in the present disclosure may be differently combined and/or modified to form still further embodiments. Additionally, it will be recognized that the methods described herein may be practiced using any device suitable for performing the recited steps. For example, in some embodiments, the swivel can be operated in an inverted orientation relative to the orientation shown in the attached figures (i.e. the housing could be positioned vertically below the rod). Such alternative embodiments and/or uses of the methods and devices described above and obvious modifications and equivalents thereof are intended to be within the scope of the present disclosure. Thus, it is intended that the scope of the present invention should not be limited by the particular embodiments described above, but should be determined only by a fair reading of the claims that follow.

What is claimed is:

1. A locking swivel snap apparatus, including
    a housing extending along a generally longitudinal axis between an upper end and a lower end, the housing comprising:
        a fishing line receiving member located at or near the first end of the housing;

a hollow interior region, the hollow interior region comprising a bearing surface at the lower end of the housing;

an opening located at the lower end of the housing, wherein the opening is in communication with the hollow interior region; and a pair of housing apertures extending through a portion of the housing, wherein said pair of housing apertures are generally located along an axis perpendicular to the longitudinal axis of the housing;

a rotatable member, wherein at least a portion of the rotatable member is retained within the housing, the rotatable member comprising:

a head portion retained within the hollow interior region of the housing, the head having a cross-sectional dimension which is larger than a cross-sectional dimension of the opening in the housing;

a shaft portion extending through the opening along an axis generally parallel to the longitudinal axis of the housing; and at least one shaft aperture extending through the shaft in a direction substantially perpendicular to the longitudinal axis of the housing;

a removable flexible clip, wherein a portion of the flexible clip is inserted through the pair of housing apertures and the shaft aperture, wherein the portion of the flexible clip extending through the pair of housing apertures interacts with the pair of housing apertures to inhibit rotation of the shaft relative to the housing about the longitudinal axis of the housing, and wherein said shaft is able to rotate relative to said housing when said flexible clip is not inserted through said pair of housing apertures;

a first fishing line secured to the housing via the fishing line receiving member; and a piece of terminal fishing tackle or bait secured to the removable flexible clip.

2. The locking swivel snap apparatus of claim 1, additionally comprising a second shaft aperture extending through the shaft and axially offset below the at least one shaft aperture, wherein a portion of the removable flexible clip can be inserted through the second shaft aperture such that the removable flexible clip does not interact with the housing to inhibit rotation of the rotatable member relative to the housing.

3. The locking swivel snap apparatus of claim 1, wherein the shaft is axially movable relative to the housing when the removable flexible clip is removed, wherein the shaft can be axially moved between a first position in which at least a portion of the shaft aperture is aligned with the pair of apertures in the housing portion, and a second position in which at least a portion of the at least one shaft aperture is located below the housing such that a portion of the removable flexible clip can be inserted through the shaft aperture such that the flexible clip does not interact with a portion of the housing to inhibit rotation of the shaft relative to the housing.

4. The locking swivel snap apparatus of claim 1, wherein the pair of housing apertures comprise arcuate scallops located on the lower end of the housing.

5. The locking swivel snap apparatus of claim 1, wherein the bearing surface comprises a beveled interior surface of the housing.

6. The locking swivel snap apparatus of claim 1, wherein the bearing surface comprises a surface of at least one ball bearing retained within the hollow interior region of the housing.

7. The locking swivel snap apparatus of claim 1, wherein said fishing line receiving member comprises a ring passing through an eye, located near the first end of the housing, wherein the first fishing line is secured to the ring.

8. The locking swivel snap apparatus of claim 1, wherein the flexible clip comprises a wire fishing snap.

9. The locking swivel snap apparatus of claim 1, wherein the piece of terminal fishing tackle comprises a fishing lure.

10. A method of using a fishing swivel snap apparatus, the method comprising:

obtaining an apparatus comprising:

a housing extending along a generally longitudinal axis, the housing comprising an upper region having an eye formed therein, a lower surface comprising an opening, a interior hollow portion in communication with the opening, and a pair of housing apertures located on opposite sides of the housing and along an axis perpendicular to the longitudinal axis of the housing;

a fishing line receiving member located at or near said upper region of the housing; and a rotatable member retained at least partially within the housing via a head portion of the rotatable member, the head portion having a cross-sectional dimension which is larger than a cross-sectional dimension of the housing, wherein the head portion contacts a bearing surface within the interior hollow portion which prevents axial movement of the rotatable member out of the housing without inhibiting rotation of the rotatable member relative to the housing about the longitudinal axis, the rotatable member comprising a shaft portion extending from the head portion through the opening in the base of the housing, the shaft portion comprising at least one shaft aperture extending therethrough in a direction perpendicular to the longitudinal axis;

moving the rotatable member to align the shaft aperture with the housing apertures;

inserting a portion of a flexible wire clip through the shaft aperture and the housing apertures, such that interaction between the clip and sidewalls of the housing apertures inhibits rotation of the rotatable member relative to the housing;

securing a first fishing line to the housing via the fishing line receiving member; and securing a piece of terminal fishing tackle or bait to the clip.

11. The method of claim 10, additionally comprising removing the flexible clip to permit rotation of the rotatable member relative to the housing.

12. The method of claim 11, additionally comprising inserting the flexible clip through a shaft aperture beneath the lower portion of said housing and extending through the shaft in a direction perpendicular to the longitudinal axis such that the flexible clip is secured to the shaft without interacting with the housing to inhibit rotation of the rotatable member relative to the housing.

13. The method of claim 12, wherein the shaft comprises a second shaft aperture axially lower than said at least one shaft aperture, wherein inserting the flexible clip through a shaft aperture such that the flexible clip is secured to the shaft without interacting with the housing to inhibit rotation of the rotatable member relative to the housing comprises inserting the flexible clip through the second shaft aperture.

14. The method of claim 11, wherein the rotatable member is rotatable about at least one full turn when the flexible clip is not inserted into the first shaft aperture.

15. A fishing apparatus, comprising:

a housing comprising:

an upper end;

an opening on a lower end, the opening aligned with a longitudinal axis of the housing; and a pair of diametrically opposed housing apertures extending through sides of the housing, wherein the pair of housing apertures are aligned along an axis passing through and transverse to the longitudinal axis of the housing;

a rotatable member comprising:

a head retained within the housing, the head including a bearing surface configured to interact with an interior surface of the housing to retain the head within the housing;

a shaft extending from the head and through the opening in the housing; and first and second shaft apertures extending through the shaft in directions transverse to the longitudinal axis of the housing, wherein the second shaft aperture is located at a lower point on the shaft than the first shaft aperture;

a resilient clip, wherein a portion of the resilient clip is insertable through the first shaft aperture and through the pair of housing apertures to engage the housing apertures to lock the rotatable member against rotation, and alternately insertable through the second shaft aperture such that the housing apertures are not engaged;

a first fishing line directly or indirectly secured to the upper end of the housing; and a piece of terminal fishing tackle or bait secured to the resilient clip.

16. The fishing apparatus of claim 15, wherein the rotatable member is rotatable about a 360° angle when the rotatable member is not inserted through the shaft aperture.

17. The fishing apparatus of claim 15, wherein the resilient clip comprises a wire fishing snap.

18. The fishing apparatus of claim 15, wherein the pair of housing apertures comprise arcuate scallops located on the lower end of the housing.

19. The fishing apparatus of claim 15, wherein the pair of housing apertures comprise circular holes extending through the housing.

20. A locking swivel snap apparatus for connecting a fishing line to terminal tackle, the apparatus comprising:

a housing comprising a longitudinal axis extending between a proximal end and a distal end, the housing comprising:

an opening at the distal end;

a cavity within the housing and in communication with the opening; and a pair of housing apertures extending through opposite sides of the housing and along an axis perpendicular to the longitudinal axis of the housing;

a rod retained partially within the cavity, the rod comprising:

a proximal rod portion having a cross-sectional dimension larger than that of the opening;

a distal rod portion extending through the opening;

at least one rod aperture extending through the rod in a direction substantially transverse to a longitudinal axis of the rod and substantially perpendicular to the longitudinal axis of the housing; and a bearing disposed at the distal end of the housing surface configured to limit translation of the rod in a distal direction such that a proximal edge of the at least one rod aperture remains proximal of at least a portion of the distal end of the housing, wherein the bearing surface does not inhibit free rotation of the rod about a 360° angle; and a removable resilient clip, wherein a portion of the resilient clip is inserted through the pair of housing apertures and the at least one rod aperture such that said portion of the resilient clip engages the housing to limit rotation of the rod relative to the housing about the longitudinal axis of the housing;

a fishing line directly or indirectly secured to the proximal end of the housing; and a piece of terminal fishing tackle or bait secured to the resilient clip.

21. The locking swivel snap apparatus of claim 20, wherein the rod additionally comprises a second rod aperture located distal of the at least one rod aperture, wherein the rod can be axially translated such that a proximal edge of the second rod aperture is located distal of the distal portion of the housing, such that the resilient clip can be inserted through the second rod aperture without engaging a portion of housing to inhibit rotation of the shaft.

22. The locking swivel snap apparatus of claim 20, wherein the resilient clip comprises a wire fishing snap.

23. The locking swivel snap apparatus of claim 20, wherein the housing comprises a constriction adjacent the opening at the distal end.

24. The locking swivel snap apparatus of claim 20, wherein the housing is substantially cylindrical.

25. The locking swivel snap apparatus of claim 20, wherein the pair of housing apertures comprise arcuate scallops located on the distal end of the housing.

26. The locking swivel snap apparatus of claim 20, wherein the pair of housing apertures comprise circular holes extending through the housing.

* * * * *